UNITED STATES PATENT OFFICE 2,691,111

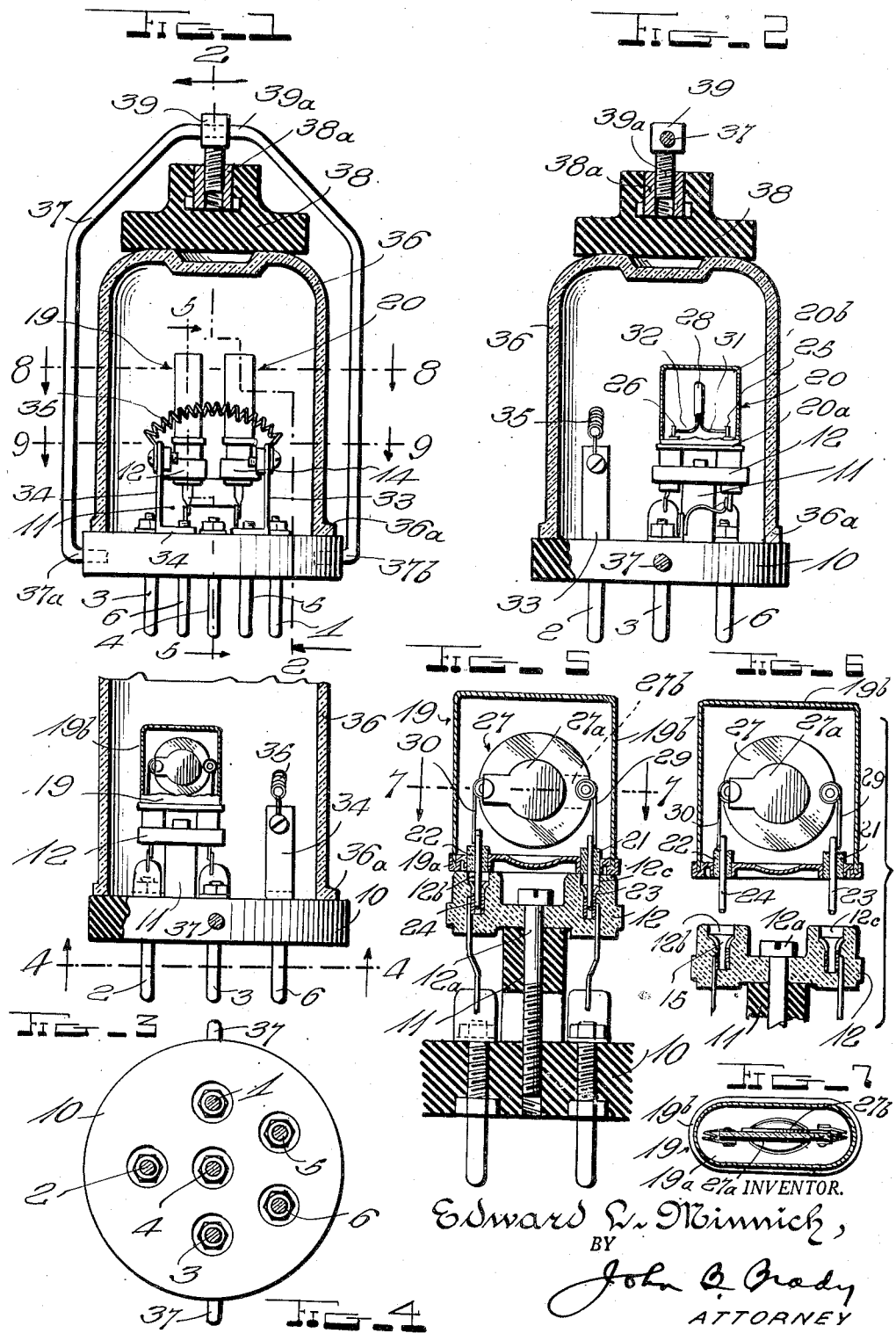

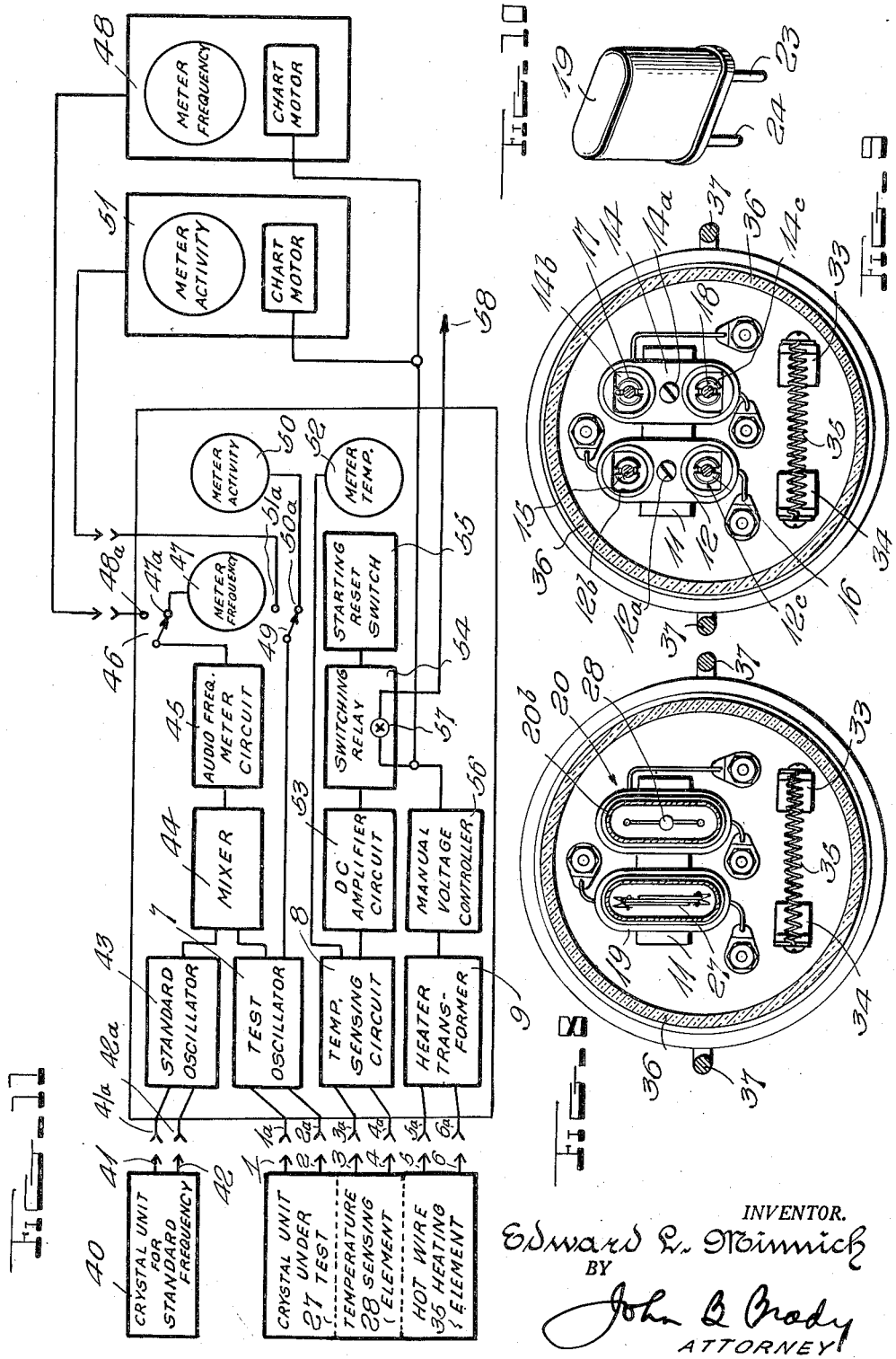

READILY ACCESSIBLE TEMPERATURE CONTROLLED PIEZOELECTRIC DEVICE TEST OVEN

Edward L. Minnich, Carlisle, Pa., assignor to Selectronics, Inc., Carlisle, Pa., a corporation of Delaware Application August 5, 1949, Serial No. 108,753

7 Claims. (Cl. 310—8.9)

My invention relates broadly to testing systems, and more particularly to a system and apparatus for testing piezoelectric crystals.

One of the objects of my invention is to provide a "fast run" testing system for piezoelectric crystals in which quartz crystals may be tested for frequency and activity over wide ranges of temperatures.

Another object of my invention is to provide a method and apparatus by which a piezoelectric crystal may be tested as to frequency and activity under conditions of a rapid rate of increase in temperature.

Still another object of my invention is to provide a method and apparatus for detecting the presence of moisture within a hermetically sealed unit.

A still further object of my invention is to provide a method of operating a piezoelectric crystal device in which moisture existent within a piezoelectric crystal unit may be driven from the inner containing surfaces and caused to be redeposited onto the crystal surfaces while the crystal is oscillating and under test.

Still another object of my invention is to provide a testing apparatus for piezoelectric crystals in which crystals may be tested in an indicating circuit while being maintained in a relatively dry atmosphere.

Still another object of my invention is to provide a method of testing piezoelectric crystals in which a quickly removable housing of insulation material is associated with a piezoelectric crystal unit for providing a test rig that is readily assembled and disassembled for mounting a piezoelectric crystal unit during testing operations.

Other and further objects of my invention reside in a system for "fast run" testing of piezoelectric units for frequency and activity, as set forth more fully in the specification hereinafter following by reference to the accompanying drawings, in which:

Figure 1 is a vertical sectional view through a piezoelectric crystal testing apparatus constructed in accordance with my invention, and showing certain of the parts in elevation; Fig. 2 is a vertical sectional view taken substantially on line 2—2 of Fig. 1, with certain of the parts shown in elevation and the casing of the temperature sensing unit broken away to show the interior structure thereof; Fig. 3 is a fragmentary vertical sectional view of the testing apparatus with certain of the parts shown in elevation, and illustrating the casing of the piezoelectric crystal unit broken away to show the interior thereof; Fig. 4 is a horizontal sectional view showing the pin terminal connecting means employed for the piezoelectric crystal apparatus; Fig. 5 is an enlarged fragmentary vertical sectional view showing the mounting means for the piezoelectric crystal unit employed in the test apparatus with the piezoelectric crystal unit mounted in position; Fig. 6 is a view similar to the view shown in Fig. 5, but showing the parts in juxtaposition with the piezoelectric crystal unit removed from the contact holder; Fig. 7 is a horizontal sectional view taken substantially on line 7—7 of Fig. 5; Fig. 8 is a horizontal sectional view taken substantially on line 8—8 of Fig. 1, and illustrating more particularly the spaced parallel relation of the casings of the temperature sensing unit and the piezoelectric crystal unit, and the association thereof with the evenly spaced turns of the heater within the transparent housing of the apparatus; Fig. 9 is a horizontal sectional view taken substantially on line 9—9 of Fig. 1, with the temperature sensing unit and the piezoelectric crystal unit removed from the supporting or mounting means; Fig. 10 is a perspective view showing the external appearance of either the temperature sensing unit or the piezoelectric crystal unit employed in the apparatus of my invention; and Fig. 11 is a block diagram showing the association of the testing apparatus of my invention with the test system and associated indicating and recording apparatus.

It is necessary to test quartz crystal units for frequency and activity over wide ranges of temperature to determine that they do or do not meet commercial and government specifications. Recently, in government specifications, it has been stipulated that the temperature should be changed from the cold extremity to room temperature at a rapid rate, approximately one minute or less. This rapid rate of increase in temperature is designed to show the presence of moisture in the sealed-in atmosphere or gas. If moisture is present, during the cooling operation it is deposited on the inner surfaces of the crystal holder in the form of frost. When the crystal unit is subjected to this rapid increase in temperature, this frost is melted and driven from the inner wall. However, the quartz crystal, which is plated and supported on wires, is lagging in its temperature rise and presents a relatively colder surface to this vapor that has been driven from the inner wall. This vapor deposits as frost on the crystal surface and causes the frequency of oscillation to change to a lower value. This frequency change is proportionate to the extent of the frosting. The extent of this frequency change will depend upon two conditions: (1) the amount of moisture enclosed within the holder and (2) the rate at which the temperature is increased. It is desirable to have as dry an atmosphere as it is possible to obtain within the holder, as the aging of quartz crystal units over extended periods of time is accelerated by the presence of moisture. Apparently, moisture within the crystal unit sets up a condition with respect to the quartz plate surfaces that can be described as a "weathering" action.

It is not necessary to know the intermediate value of temperature during the testing operation over these wide ranges if, during the test, continuous measurements of frequency and activity are made. It is, however, necessary to establish the end parameters, and a temperature sensing device must be employed with equipment designed for this method of testing. My invention provides a testing equipment that meets all of the foregoing requirements.

My invention comprises a quartz crystal unit, in combination with a temperature sensing device, and a heating element enclosed within a housing of insulation material. The structure prevents excessive frosting on the exterior of the circuit elements during the test operation. The test apparatus is fitted with circuit connecting contacts and plugs into a receptacle on the front panel of the test equipment. Two of these contacts provide a low A. C. voltage for energizing the heating element. Two contacts are supplied for the temperature sensing device and two for the quartz crystal unit. The sensing device is mounted in a crystal holder which is the same or similar to that employed for the quartz crystal unit, and both the sensing device and the quartz crystal unit are uniformly spaced and positioned adjacent the heating element.

The test assembly with the housing of insulation material in place is positioned in a cold box, which is adjusted to maintain the temperature at −55° C. or at any other temperature representing the lowest value of the specified range. This assembly remains in the cold box until all of its components have assumed the temperature of the box. It is then withdrawn and inserted into the receptacle provided on the front panel of the test instrument. The heater voltage is turned on and the temperature of the crystal unit and the sensing device is brought up to the upper limit of the temperature range specified for the crystal unit operation. During this operation, the frequency of the crystal unit is compared with a standard signal and the frequency by which it differs from the standard is either visually checked on a meter or graphically shown on a recording instrument. In the same manner, its activity in terms of rectified grid current in the oscillator circuit is checked or recorded.

An important thing necessary to the success of this method of testing is the sensing device such as a thermistor and the way it is utilized. This sensing device consists of a small element having a high negative coefficient of resistance with respect to temperature. The resistive element is enclosed in a glass bead fused to a glass stem. The leads run from this bead through the stem and extend beyond the stem to facilitate connection into the circuit. It is highly desirable that this temperature sensing device weigh approximately the same as the quartz crystal subjected to these tests, or possess approximately the same thermal mass, in order that transfer of heat from outside the crystal unit and the temperature sensing element be the same for any given conditions of change in the ambient temperature.

This method of testing and the apparatus employed in conducting the tests in accordance with my invention detects the presence of moisture within a hermetically sealed crystal unit. The presence of moisture within the sealed unit is undesirable in that it affects the aging characteristics of the crystal unit with respect to change in frequency with time. I have developed production methods in manufacturing these crystal units which are designed to eliminate this moisture or reduce it to a minimum. The test apparatus described herein shows that the moisture content has been held to the extremely low level required.

In order to understand why this method of testing detects moisture, it will be advisable to consider the following facts. The moisture is detected not in a vapor form but in a solid form. This detection takes place at extremely low temperatures where the moisture, if any, is present in the form of small ice crystals. In order for their detection to take place, these ice crystals must be caused to deposit on the quartz crystal surface. It must be remembered that these particular crystal units have plated upon them a very thin metallic film which serves as the electrodes. These films are in the order .000015″ to .000025″ in thickness and form a dimensional and weight point of view, they are practically non-existent with respect to the crystal. This frost deposition that must be made on this crystal surface takes place over the complete major surfaces, whether it be a plated or an unplated region.

In order to effect the test, these ice crystals must be caused to form on the crystal surface, and to understand this consideration must be given to the testing procedure. A crystal unit that is to be tested is inserted into the socket incorporated in the test assembly and the assembly placed in a chamber filled with Dry Ice, where circulating air is maintained at a temperature as low as, or slightly lower than, −55° C. or some other low temperature which represents one end of the specified temperature range over which the crystal is required to perform satisfactorily. Now let it be assumed that some moisture has been included in this crystal unit. Moisture content within a gas, when of relatively low values, is sometimes evaluated in terms of dew point. For an atmosphere with a given content of moisture, dew will be deposited at some definite temperature. If the moisture could be increased the dew point would take place at a higher temperature; decreased, the dew point would take place at a lower temperature. Now let us try to visualize what takes place inside this crystal unit from the instant it is placed into this cold ambient temperature. The sides of this crystal unit are constructed of metal and are a good conductor of heat. These metal surfaces will give up their heat the quickest, and during this rapid cooling process, the temperature of the inner surfaces of this metal wall will always be lower than the temperature on the surfaces of the quartz crystal mounted within these walls. This condition will exist during the entire cooling process and only after the unit has been maintained in this low ambient for some considerable time, for example, twenty minutes, will there cease to be a temperature differentiation between the crystal surfaces and the metal wall surfaces of the enclosure. Now this condition is important in that it sets up a selective condition with respect to where the contained moisture vapors will be deposited. This deposition will take place on the inner surfaces of the container, in that this is always cooler than the crystal during the period when the vapor is being precipitated. This deposition in the form of dew on the inner surfaces of the container is almost instantly frozen, so that this deposition of dew is really a frosting of this inner wall.

The cover for the crystal unit has been described as of metal but I desire that it be understood that the same method of test may be applied to testing crystal units employing covers or casings of other materials such as phenol condensation products or plastic materials.

From the foregoing it will be seen that by a selective means moisture has been caused to be deposited as frost on surfaces other than the crystal. By actual test and measurements I have substantiated this, and there is practically no frost deposited on the crystal surfacse at this phase of the test procedure. But disposed within the container there is this crystal with the thin metal films deposited thereon ready to receive all of this moisture in the form of frost if the conditions just described are reversed. These conditions are reversed by increasing the temperature at a rapid rate from this low end point. Let us now consider what happens under these reverse conditions which are set up by the crystal testing apparatus of my invention.

To start with, the crystal unit is extremely cold. Any moisture that is contained within the crystal unit is present as frost on the inner surfaces of the containing can. A heating coil disposed immediately adjacent the crystal unit causes it to rise in temperature at a rapid rate (the fast run). In doing this there is set up a temperature gradient between the can (including its inner surface) and the crystal surface of the blank contained therein, but this temperature gradient is reversed with respect to that set up in the cooling operation. As a result the frost on the inner wall is melted and almost instantly vaporizes, but at the same instant, the crystal is at a much lower temperature, and this vapor striking this relatively colder surface reprecipitates on the crystal surface as frost. This causes a sharp change in the oscillating frequency of the crystal and it is this sudden abrupt change in frequency that tells us that an excessive amount of moisture in the form of vapor had been sealed within the crystal unit. There are a number of Government specifications for crystal units that include within them a provision calling for rejection of units containing sealed-in moisture of sufficient quantity to cause the frequency to go beyond the specified frequency limits. A very small amount of moisture is sufficient to cause the crystal to be rejected under these terms. Since it is economically and production-wise important to restrict the number of rejects the importance of this method of testing will be readily appreciated.

The frequency change due to the frost deposition on the crystal surface may be explained as follows: The frequency of oscillation of these crystal units is determined by the thickness of the blank. The major surfaces of the crystal are in motion when it is oscillating, as it is during the test. Foreign material can be deposited on these surfaces and, providing the deposition is not too heavy by weight and is relatively uniform with respect to density and thickness over the surface, the crystal will continue to oscillate. The deposition of the thin metal films which serve as electrodes is an example of this. I control these depositions in order to effect the adjustment of the frequency of oscillation. The more plating that is put on, the lower will be the frequency of oscillation. The reason for this is that the metal plating is not an active part of the oscillating system, and its effect is that of loading the crystal. Any foreign material that is caused to adhere to the crystal surface lowers its frequency. The deposition of frost gives the same reaction. It has added mass to the oscillating system and, as a result, the frequency becomes lower. When the temperature of the crystal becomes sufficiently high to cause the frost to melt, the moisture leaves the crystal surface and the frequency assumes its normal value. As I have stated before, this reaction in frequency is very sharp and is easily detected in this method of testing. I might also point out that this reaction takes place below room temperature and generally somewhere near 0° C. The temperature at which it does take place is not an absolute or fixed value.

In production procedure I seal these crystal units in an atmosphere of extra dry nitrogen and under conditions of heat to drive off all traces of moisture. This apparatus also tests the crystal unit for its frequency coefficient and its activity over wide temperature ranges in relatively short periods of time. I have successfully tested crystal units according to this invention at the average rate of one in three minutes. This is a continuous operating test. Other methods of testing that are presently used or have been used in the past are to check several crystals in one testing operation wherein the temperature is varied very slowly over the range of operation required and the crystals are switched into the oscillatory circuit in sequence. The temperature is varied at a sufficiently slow rate to enable each crystal unit to be checked at least once for every 3° C. change in temperature. Thus, it is impossible to know just how the crystal performs over every 2° or 3° period as it is not operated continuously. Switching methods that I have used have a capacity of 25–50 crystal units and approximately two hours are required for testing these units over the wide temperature range of −55 to +90°, as compared with the fast run operation of the instant invention which requires less than three minutes, testing the operation of the crystal unit continuously over the same temperature range.

Referring to the drawings in detail, reference character 10 designates a base of insulation material which provides a mounting means for the elements of the piezoelectric crystal apparatus. This base is preferably circular, and may have an approximate thickness of ⅜″ and a diameter of approximately 2½″, and forms a support for a multiplicity of contact pins which I have illustrated at 1, 2, 3, 4, 5 and 6, depending from the base, and provided with terminals on the top of the base for the several components forming the piezoelectric crystal apparatus. These contact pins are so arranged that the piezoelectric crystal apparatus can be plugged into coacting contacts 1a, 2a, 3a, 4a, 5a and 6a, electrically connected with the circuits of the testing apparatus shown in Fig. 11. The pins 1–6 are arranged in such a way that the fixture can be plugged into the testing apparatus only in the correct position for the proper connection of all of the circuit elements.

The test oscillator 7, the temperature sensing circuit 8, and the heater voltage connections represented by transformer 9, are all completed through these six contact pins. On the top of the base 10 I provide a bridge of insulation material represented at 11, having a pair of spaced feet which are supported on the base of insulation material 10, and providing mounting means for a pair of spaced laterally extending socket supporting members 12 and 14. The socket supporting members 12 and 14 are approximately elliptical in shape, as represented more clearly in Fig. 9, and are secured in position by screw means 12a and 14a, which extend through the socket supporting members 12 and 14 and through the bridge 11 and enter aligned screw-threaded recesses in base 10, as represented more clearly in Fig. 5. The socket supporting members 12 and 14 are shaped or transversely recessed to fit over the top of bridge 11 in such a way as to prevent twisting or misalignment thereof, so that the two socket supporting members are maintained in substantially parallel spaced relation.

Each socket supporting member 12 and 14 is provided with a pair of spaced, substantially cylindrical recesses therein, represented at 12b and 12c and 14b and 14c, within which there are provided the resilient socket contact sleeves represented at 15, 16, 17, and 18, which are electrically connected respectively with the pin terminals 1, 2, 3 and 4. Thus, electrical connections are completed externally of the piezoelectric crystal apparatus to the socket holders for the piezoelectric crystal unit represented at 19 and the temperature sensing unit represented at 20.

The piezoelectric crystal unit 19 includes a base member 19a and a metallic cover member 19b. Similarly, the temperature sensing unit 20 includes a base member 20a and a metallic cover member 20b of symmetrical shape and form to the corresponding elements 19a and 19b. Each base member 19a and 20a carries a pair of spaced sleeves of insulation material therein designated, for example, at 21 and 22 in Figs. 5 and 6, through which pin terminals extend in insulated spaced relation. In Figs. 5 and 6 these pin terminals have been represented, for example, at 23 and 24, individual to the piezoelectric crystal unit 19. Similarly, a set of pin terminals is provided for the temperature sensing unit 20, as represented at 25 and 26 in Fig. 2. These sets of pin terminals extend interiorly within the respective housings of the piezoelectric crystal unit and the temperature sensing unit, and provide mounting means for piezoelectric crystal 27 and the thermistor or temperature sensing element 28 respectively. The piezoelectric crystal 27 is provided with electrodes on the surface thereof, represented at 27a and 27b. Electrical connection is established with electrodes 27a and 27b through the connecting wire elements 29 and 30, which extend to the pin terminals 23 and 24 for suspending the piezoelectric crystal and establishing electrical connection therewith while the crystal is maintained in spaced relation interiorly within metallic housing 19b.

Similarly, I provide mounting means for the thermistor or temperature sensing device 28, connected through leads 31 and 32 as shown in Fig. 2 to pin terminals 24 and 26. The thermistor 28 is supported in spaced relation to the interior walls of metallic housing 20b.

The piezoelectric crystal apparatus includes a pair of bracket members 33 and 34 connected with the pin terminals 5 and 6, and which provide mounting means for the heater unit 35. The heating unit 36 is formed from Nichrome wire wound in a spiral with uniformly spaced turns. Approximately four volts A. C. is required for operation of the heater unit. The spiral wire is bent into the form of an arc, and connected electrically to the upper ends of brackets 33 and 34 so that the heating element extends away from the base 10 and in a position under the piezoelectric unit crystal 27 and under the temperature sensing device 28, but adjacent thereto. The heater element 35 is disposed a uniform distance and in a plane extending substantially normal to the planes of the housing 19 of the piezoelectric crystal unit and the housing 20 of the thermistor or temperature sensing device. As will be noted from Fig. 10, the piezoelectric crystal unit and the thermistor or temperature sensing device, are mounted in symmetrically shaped housings which are approximately elliptical in transverse section, and have their side walls extending in planes parallel to each other but spaced therefrom, as represented in Fig. 1 in planes which extend substantially normal to the plane of the heater 35. The casings 19b and 20b are separated from each other to allow passage of heated air on both sides of the crystal and the sensing device. Care must be exercised in spacing them in such a way that both the crystal and the temperature sensing device are uniformly affected by the heating element. For the same reason, the heating element must show a uniform degree of heat as indicated by a uniform red color throughout its length. To effect this, the spirals must be uniform in their spacing.

As previously mentioned, the temperature sensing device consists of a holder indentical to that employed with the crystal unit under test, in which has been mounted thermistor 28 or some similar device. It is desirable that the thermistor element have approximately the same mass as the quartz crystal under test. This can be done by carefully breaking away part of the glass stem from the lead wires until the element assumes approximately the same weight as the quartz crystal blank employed in the units to be tested.

The housing 36 for the piezoelectric crystal apparatus is in the form of an inverted substantially cylindrical cup-like enclosure of insulation material, represented at 36, having a ground peripheral flange 36a thereon, adapted to make uniform contact with the surface of base 10 and entirely enclose the three components constituting the piezoelectric crystal apparatus, that is, the piezoelectric crystal 27, the temperature sensing device 28, and the heater 35. The enclosure 36 of insulation material is removably secured in position over these components by means of a pivotally mounted spring bail 37, having the ends thereof pivotally mounted at 37a and 37b in recesses in diametrically opposite sides of the base 10, so that the bail is free to swing over the top of the housing 36 and carries thereon the adjustable pressure applying member 38. The pressure applying member 38 is formed from insulation material having a screw-threaded sleeve 38a therein, adapted to engage the screw-threaded stem 39a of the swivel member 39. The pressure applying member 38 is thus adjustable with respect to the top of the bail, so that proper pressure may be applied to the top of the housing 36 in maintaining the housing 36 in position over the several components constituting the piezo-electric apparatus, but free to be quickly removed for disassembly of the apparatus for inserting and removing a piezoelectric crystal unit under test. It is essential that the assembly and disassembly be effected quickly, so the resilient clamping means provided by bail 37 has been designed to require minimum consumption of time in effecting disassembly and removal and replacement of the piezoelectric crystal units.

In Fig. 11 I have shown diagrammatically in block arrangement the relationship of the piezoelectric crystal apparatus of my invention with the test and indicator equipment. The standard crystal unit calibrated for standard frequency with respect to which the test crystal must be checked, is represented generally at 40, having pin terminals 41 and 42 coacting with socket contacts 41a and 42a leading to the standard oscillator 43. The test oscillator 7 which connects with the crystal unit under test at 27, has its output combined with the output of standard oscillator 42 through mixer circuit 44, which connects to the audio frequency meter circuit 45, the output of which connects through selector switch 46 to either the indicating meter 47 or to the recording meter apparatus 48 to contacts 47a or 48a respectively. The test oscillator 7 is connectable through selector switch 49 with either the indicating meter 50 or the recording meter apparatus 51 through contacts 50a or 51a. The function of the activity meters, recording or direct reading, is to measure the activity of the crystal unit in terms of rectified grid current that is developed in the oscillator circuit. An active crystal gives more output than a crystal of low activity. The connections through selector switch 49 with either the indicating meter 50 or the recording meter 51 are made for the purpose of measuring the rectified grid current developed in the oscillator circuit 7, which is proportional to the activity of the crystal unit 27 under test.

The temperature sensing circuit 8 connects to indicating meter 52 and also to the D. C. amplifier circuit 53 and through the switching relay system 54 to the starting reset switch 55.

The heater transformer 9 is connected through the manual voltage controller represented at 56 and through the switching relay system 54, to the power source indicated at 58. The testing operator observes the changes in frequency and activity, if any, by reading the milliammeters 47 and 50, or the charts from the graphic recording meter apparatus 48 and 51. The meter 52 is observed, to determine when the temperature at the hot end of the test range has been reached. These meters are grouped close together on the panel, so that the observer can watch the three instruments at one time.

In calibrating the apparatus for carrying out a test in accordance with my invention, the piezoelectric crystal apparatus in Figs. 1-10 is inserted in its regular socket on the front of the associated electronic equipment with the cover removed. The thermistor, or temperature sensing element 20, is removed from its socket 14 and placed in a thermostatically controlled oven. Leads of considerable length may then be connected to the sensing element in the oven, making connection with the socket into which it is normally inserted in the piezoelectric crystal device or apparatus. Now, as the temperature is adjusted to any desired value in the oven, an observer may read in electrical terms on the temperature meter 52 a corresponding value. In this way this temperature meter is calibrated in terms of scale reading or current value, with the temperature of the sensing element. Since this is purely a D. C. circuit and the resistances involved are relatively high, long leads may be employed, as a few ohms introduced by these leads will affect the calibration very slightly. For any known ambient temperature within the oven or box, a corresponding value may be determined in terms of microamperes on the indicating meter 52 and as many intermediate points in temperature as desired may be similarly correlated to corresponding meter readings.

The test circuit may be automatically turned off at the completion of the temperature run by means of a D. C. amplifier and relay or similar device used in conjunction with the current flowing through the temperature sensing device. This D. C. amplifier is necessary because it is advisable to employ low voltage and current in order to minimize self-heating. By automatically turning off the associated electronic test apparatus at the completion of the fast run and by using recording meters for indicating frequency and activity, the operation is made entirely automatic from the time the crystal unit under test is inserted into this equipment.

It is only necessary for the operator to plug the chilled test unit of Figs. 1-10, which has been maintained in a cold box, into the six contact receptacle and push the reset starting switch when the temperature meter indicates the value corresponding to the temperature at the cold end of the range. In this manner one operator can handle several of these test setups.

The piezoelectric crystal and the temperature sensing device are housed in enclosures of the same material which, because of their symmetry in thermal characteristics, receive substantially equal heat treatment from the electric heater 35 throughout the test operations.

Wherever in the claims I have referred to the housing 36 and the pressure applying member 38 as being of insulation material I desire that it be understood that these members may be formed from metal or other material which is not necessarily insulation material.

I have found the test apparatus of my invention highly practical and successful in operation, and while I have described my invention in one of its preferred embodiments, I realize that modifications in my invention may be made, and I desire that it be understood that no limitations upon my invention are intended other than may be imposed by the scope of the appended claims.

What I claim as new and desire to secure by Letters Patent of the United States, is as follows:

1. A piezoelectric crystal testing apparatus comprising a base, contact pins carried by said base, a piezoelectric crystal unit, a temperature sensing device, a heater, all supported by said base and electrically connected with said contact pins, a detachable housing of insulation material supported by said base and extending vertically therefrom and enveloping and covering said piezoelectric crystal unit, said temperature sensing device, and said heater, detachable securing means for said housing comprising a bail pivotally connected with said base and extending upwardly in spaced relation to the vertically extending housing and swingable across the top of said housing, and means carried by said bail and engageable with the top of said housing for maintaining said housing in detachable position over said piezoelectric crystal unit, said temperature sensing device, and said heater.

2. A piezoelectric crystal testing apparatus comprising a base, contact pins carried by said base, a piezoelectric crystal unit, a temperature sensing device, and a heater, all supported by said base and electrically connected with said contact pins, a detachable housing of insulation material supported by said base and extending vertically therefrom and enveloping and covering said piezoelectric crystal unit, said temperature sensing device and said heater, a resilient wire bail pivotally mounted on said base and extending upwardly in spaced relation to the vertically extending housing and swingable to a position enveloping said housing, and a pressure applying member carried by the top of said bail and adjustable in position thereon for engaging the top of said housing and maintaining said housing in a detachable position covering said piezoelectric crystal unit, said temperature sensing device and said heater.

3. A piezoelectric crystal testing apparatus comprising a base, contact pins carried by said base, a piezoelectric crystal unit, a temperature sensing device and a heater, all supported by said base and electrically connected with said contact pins, a detachable housing of insulation material supported by said base and extending vertically therefrom and enveloping and covering said piezoelectric crystal unit, said temperature sensing device and said heater, a bail pivotally mounted in diametrically opposite positions in said base extending upwardly in spaced relation to the vertically extending housing and swingable to a position embracing said housing, a pressure applying member interposed between the top of said housing and said bail, a screw-threaded sleeve in said pressure applying member, and a screw device swivelled at the top of said bail and screw threaded into said screw-threaded sleeve whereby said bail when moved to a position directly over said housing maintains said pressure applying member in an adjusted position against the top of said housing for detachably maintaining said housing over said piezoelectric crystal unit, said temperature sensing device and said heater.

4. A piezoelectric crystal testing apparatus comprising a base, a multiplicity of pin connectors depending from said base, a bridge member of insulation material supported by said base, a pair of spaced socket supporting members mounted on said bridge member in spaced, substantially parallel planes extending in directions normal to the plane of said bridge member, a pair of sockets carried by each of said socket supporting members, a piezoelectric crystal unit and a temperature sensing unit of substantially the same physical dimensions terminating in contact pins detachably engageable in said sockets and extending in spaced, parallel planes, a heater carried by said base and connected with two of the pin connectors depending therefrom, said heater extending in a plane substantially normal to the planes of said piezoelectric crystal unit and said temperature sensing unit and a tubular vertically extending cover open at the bottom and closed at the top and quickly mountable and demountable on said base over said bridge member, said socket supporting members, said heater, said temperature sensing unit and said piezoelectric crystal unit and supported by said base, and means connected with said base and extending in spaced relation to the external sides of said vertically extending cover and detachably engageable with the top of said cover for maintaining said cover in detachable engagement with said base.

5. A piezoelectric crystal testing apparatus comprising a base, a multiplicity of pin connectors depending from said base, a bridge member of insulation material supported by said base, a pair of spaced socket supporting members mounted on said bridge member in spaced, substantially parallel planes, a pair of sockets carried by each of said socket supporting members, a piezoelectric crystal unit and a temperature sensing unit of substantially the same physical dimensions terminating in contact pins detachably engageable in said sockets and extending in spaced, parallel planes, a heater carried by said base and connected with two of the pin connectors depending therefrom, said heater extending in a plane substantially normal to the planes of said piezoelectric crystal unit and said temperature sensing unit, said heater being disposed below said piezoelectric crystal unit and said temperature sensing unit and a tubular vertically extending cover open at the bottom and closed at the top and quickly mountable and demountable on said base over said bridge member, said socket supporting members, said heater, said temperature sensing unit and said piezoelectric crystal unit and supported by said base, and means connected with said base and extending in spaced relation to the external sides of said vertically extending cover and detachably engageable with the top of said cover for maintaining said cover in detachable engagement with said base.

6. A piezoelectric crystal testing apparatus comprising in combination an enclosed piezoelectric crystal unit and an enclosed temperature sensing unit, said units having approximately the same thermomass, a base member of insulation material, means for detachably mounting said units with respect to said base, electrical terminals carried by said base and electrically connected with each of said units, an electrical heater supported by said base, said piezoelectric crystal unit and said temperature sensing unit being equally spaced from said electrical heater whereby they are uniformly affected by said electrical heater, a vertically extending housing mounted on said base and operative to enclose both of said units and said electrical heater, and means extending in spaced relation to the sides of said vertically extending housing and pivotally engageable in said base and detachably engageable with the top of said housing for detachably securing said housing in position on said base.

7. A piezoelectric crystal testing apparatus comprising a supporting base of insulation material, pin connectors depending from the bottom of said base, a bridge member of insulation material extending upwardly from the top of said base, a pair of spaced socket supporting members carried by said bridge of insulation material, said socket supporting members extending in directions normal to the plane of said bridge member sockets carried by said socket supporting members, a pair of removable units terminating in pin terminals removably engageable in said sockets, said units being formed by box-like enclosures of substantially the same physical dimensions and having flat metallic wall portions spaced from each other in substantially parallel planes, a piezoelectric crystal unit disposed in one of said units, a temperature sensing unit disposed in the other of said units, an electric heater carried by said base and uniformly spaced from both of said units for applying heat to said units in a uniform manner, and a tubular vertically extending cover open at the bottom and closed at the top and quickly mountable and demountable on said base over said bridge member, said socket supporting members, said heater, said temperature sensing unit and said piezoelectric crystal unit and supported by said base, and means connected with said base and extending in spaced relation to the external sides of said vertically extending cover and detachably engageable with the top of said cover for maintaining said cover in detachable engagement with said base.

References Cited in the file of this patent

UNITED STATES PATENTS

| Number | Name | Date |
|---|---|---|
| 763,062 | Kohler | June 21, 1904 |
| 1,636,684 | Culver | July 26, 1927 |
| 2,132,334 | West | Oct. 4, 1938 |
| 2,178,225 | Diehl et al. | Oct. 31, 1939 |
| 2,438,345 | Miller | Mar. 23, 1948 |
| 2,455,520 | Prudhon et al. | Dec. 7, 1948 |
| 2,470,134 | Bitner | May 17, 1949 |
| 2,607,818 | Richards | Aug. 19, 1952 |